May 13, 1924.

Re. 15,839

J. E. McMINN

COAL CHUTE

Original Filed July 18 1922 3 Sheets-Sheet 1

Inventor
J. E. McMinn
By Hull, Brock & West
Attys.

May 13, 1924. Re. 15,839

E. McMINN

COAL CHUTE

Original Filed July 18 1922 3 Sheets-Sheet 2

Inventor
J. E. McMinn
By Hull, Brock & West
Attys.

May 13, 1924. Re. 15,839

J. E. McMINN

COAL CHUTE

Original Filed July 18 1922 3 Sheets-Sheet 3

Inventor
J. E. McMinn
By H. M. Brockenbrough
Atty.

Reissued May 13, 1924. Re. 15,839

UNITED STATES PATENT OFFICE.

JOHN E. McMINN, OF LOUISVILLE, KENTUCKY, ASSIGNOR TO PEERLESS MANUFACTURING COMPANY, OF LOUISVILLE, KENTUCKY, A CORPORATION OF KENTUCKY.

COAL CHUTE.

Original No. 1,438,124, dated December 5, 1922, Serial No. 575,876, filed July 18, 1922. Application for reissue filed October 5, 1923. Serial No. 666,860.

*To all whom it may concern:*

Be it known that I, JOHN E. McMINN, a citizen of the United States, residing at Louisville, in the county of Jefferson and State of Kentucky, have invented certain new and useful Improvements in Coal Chutes, of which the following is a full, clear, and exact description, reference being had to the accompanying drawings.

My invention relates to improvements in chutes for coal or other fuel, or the like, in which it is intended to provide a convenient and unobstrusive, if not ornamental, arrangement which will remain closed when not in use; and at the same time will afford more or less light to the coal cellar or fuel bin when in the closed position, but which may be readily opened for use and conveniently restored to the initial closed position when desired.

Figure 2:
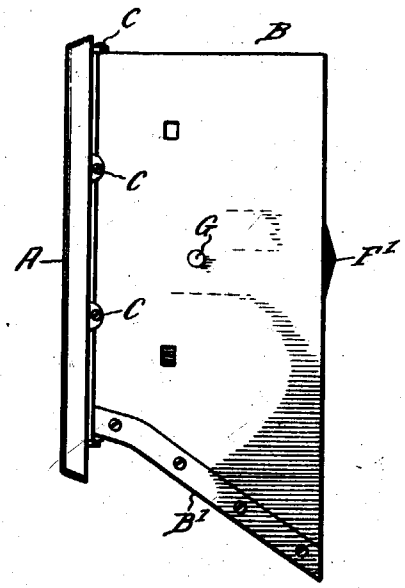
Figure 1:
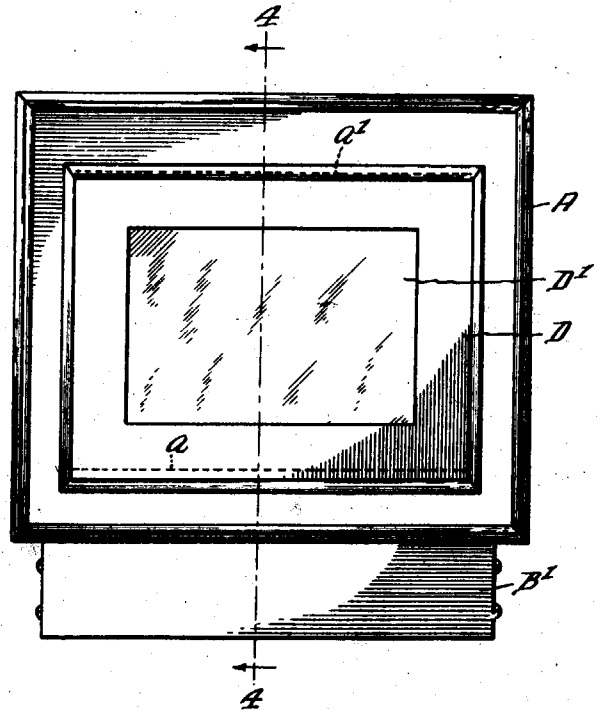
Figure 3:
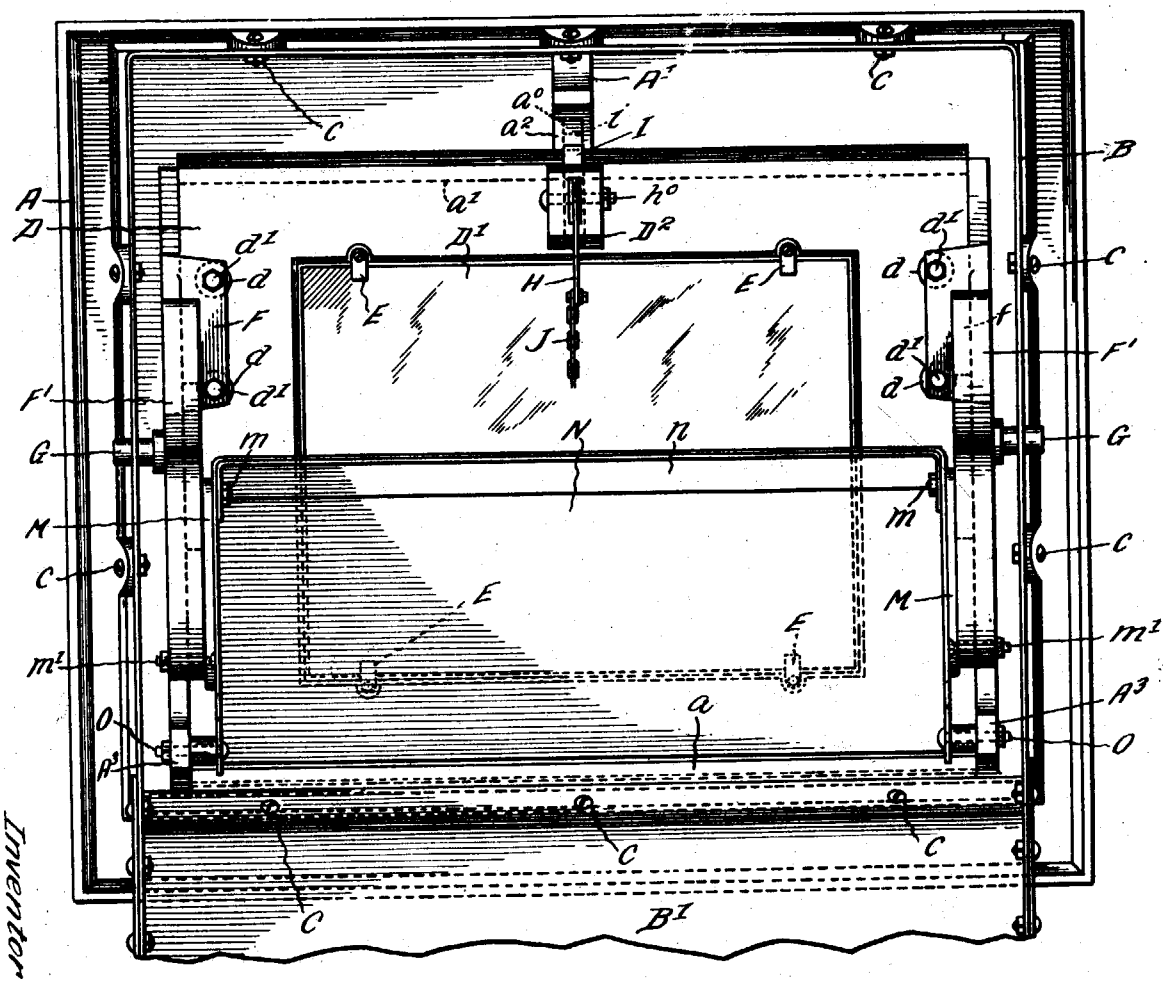
Figure 4:
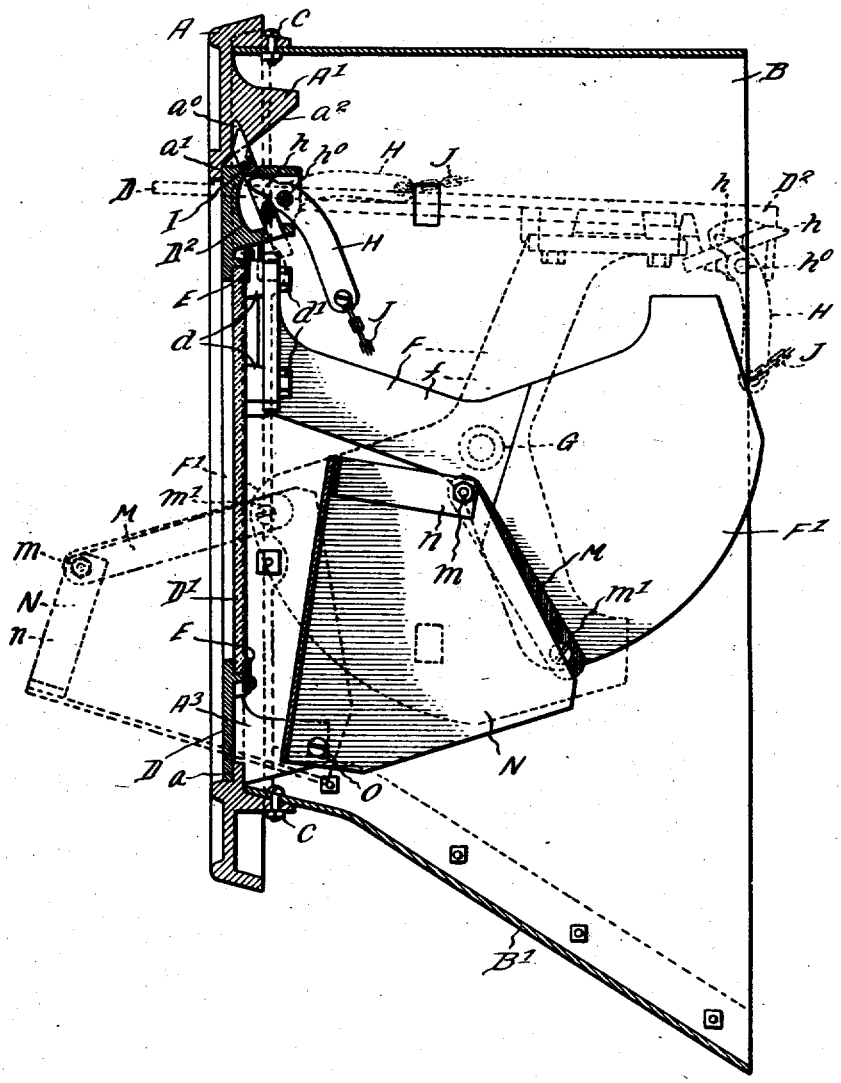

My invention will be more fully understood after reference to the accompanying drawings, in which like parts are indicated by similar reference symbols throughout the several views, and in which Fig. 1 is a front view of the device as seen from the exterior of the building in which it is used; Fig. 2 shows a side elevation of the device as detached; Fig. 3 is a rear view, on a larger scale, showing the interior of the device, parts being broken away; and Fig. 4 shows a section along the line 4—4 of Fig. 1, and looking in the direction of the arrows, but on a larger scale than in said figure.

A represents the frame adapted to be mounted in an opening in the wall of a building, as above the pavement or in any other convenient location. This frame may be mounted in the masonry of the building, or secured to the wooden framework of the building in any convenient way. The method of mounting, not being a part of my invention, is not shown herein.

Attached to the rear of this frame A is a hood B, preferably made of sheet metal, and having an inclined lower bottom portion B′ to direct the fuel downwards and inwards. This hood may be attached to the frame in any convenient way, as by the bolts C.

D represents a door frame, in which a panel D′, preferably made of heavy glass with wire embedded therein, is secured in any convenient way as by means of the clamps E. The edges of this door frame engage the flanged portions $a$ and $a'$ of the main frame A, as shown in Fig. 4, when the door is in the closed position indicated in full lines in said figure. The door frame D is provided at each side with lugs $d$ to which the flange $f$ of the arm F is secured, as by means of the bolts $d'$. There are two of these arms F, one on each side of the hood B, and each of these arms carries a counterweight F′ so adjusted as to automatically lift the door or swing it to the open position, as shown in dotted lines in Fig. 4, when the latch is released as will be hereinafter described.

These arms F are pivoted, as at G, to the hood B.

The door is normally held in the closed position by means of the sliding catch I, having its nose $i$ projecting up into the notch $a^0$ formed in the lug A′ in the upper portion of the main frame A, adjacent to which notch the lug is provided with a wedge face $a^2$, as shown in Figs. 3 and 4. This catch is normally held in the closed position by means of the toe $h$ of the lever H, which is pivoted, as at $h^0$, to the lug $D^2$ forming part of the door frame, as shown most clearly in Figs. 3 and 4.

To the longer arm of this lever H the cord or chain J is attached. By pulling up on this chain, as from a floor above, the catch I is pulled down and the door frame is released, and the said door frame carrying the door with it is automatically swung up into the position shown in dotted lines in Fig. 4, where the glass pane will be entirely masked in the upper portion of the hood and will not be injured by the dumping of coal or other solid material into the chute.

In order to provide an automatic extension of the coal chute which will project out beyond the face of the door, opening, when the door is lifted, and which will be swung back in the position behind the door, when the door is closed, I provide an auxiliary chute N, which is provided at its upper and outer projecting end with a reinforcing strap $n$, pivotally connected, as at $m$, to the link M, which link is pivoted, as at $m'$, to the counterweight F′. There are two of these links M, one on each side of the hood, as shown most clearly in Figs. 3 and 4. The auxiliary chute is pivoted at points nearly opposite the pivot $m$, as by means of the bolts O, to the lugs $A^3$ projecting inward from the main frame A, as shown in Figs. 3 and 4. When the door is closed this auxiliary chute will be swung up to the position shown in full lines in Fig. 4, and when the door is opened the chute will be swung down to the position shown in dotted lines in Fig. 4, and in such position will project beyond the edge of the door opening and will serve as an inclined chute to direct the fuel or other solid material into the hood B, which fuel will slide, by its own weight, down the inclined bottom B′ of the hood B.

The operation of the device is as follows: The apparatus being mounted in the side of a house in any convenient way, and the door being closed, and the parts being otherwise in the position shown in Fig. 4, if it is desired to open the door lift on the chain J. This will cause the toe $h$ to draw down the catch I, disengaging the nose $i$ of said catch from the notch $a^0$, and the counterweight $F^1$ will then swing the door frame and door upwards, causing these to assume the position shown in dotted lines in Fig. 4. If the auxiliary chute is attached, this auxiliary chute will be at the same time rocked about its pivot O until it and its supporting links assume the position shown in dotted lines in Fig. 4, at which time the bottom $m$ of the auxiliary chute will project outwards beyond the door opening and will facilitate the supply of fuel to the chute.

In order to restore the parts to the initial position, pressing down on the links M near their pivots $m$, will swing the counterweight F backwards, and simultaneously lifting up on the outer edge of the bottom of the auxiliary chute will facilitate the restoring of the parts to the position shown in full lines in Fig. 4. When the nose $i$ of the catch I engages the wedge face $a^2$ of the lug A′ this catch will be pressed backwards until the nose $i$ registers with the notch $a^2$, when the weight of the lever H and the chain J will restore the catch to the initial position, and the parts will be automatically locked in the position shown in full lines in Fig. 4.

While I prefer to provide the auxiliary chute, as hereinbefore described, the device may be operated without this attachment.

It will be seen that the herein described apparatus provides a practically tight closure which will keep out rain, dust, air, or the like, and yet which may be automatically opened and conveniently closed when desired. Furthermore, the device may be made of a neat exterior and is not objectionably conspicuous in any way, or it may be made quite ornamental if desired.

Furthermore, it will be noted that the glass used for illuminating purposes is set back so as not likely to be injured by ordinary accidents and is removed entirely out of the way when the solid material is being delivered to the chute. It will be obvious that in place of glass a panel made of metal or wood may be used if desired, but glass is preferable because it transmits light.

It will be obvious that various other modifications might be made in the herein described construction, and in the combination and arrangement of parts which could be used without departing from the spirit of my invention; and I do not mean to limit the invention to such details except as particularly pointed out in the claims.

Having thus described my invention, what I claim is:

1. A chute for coal or the like comprising a rectangular main frame adapted to be attached to the side of a building and provided with a central opening, a rectangular hood attached to the back of said frame and provided with a downwardly inclined bottom, arms provided with counterweights pivoted to said hood, a door frame carried by said arms and adapted to close said rectangular opening and to be normally swung open by said counter-weights, and a latch normally locking said door frame and said main frame, with means for releasing said latch when desired.

2. A chute for coal or the like comprising a rectangular main frame adapted to be attached to the side of a building and provided with a central opening, a rectangular hood attached to the back of said frame and provided with a downwardly inclined bottom, arms provided with counterweights pivoted to said hood, a door frame carried by said arms and provided with a glass panel therein adapted to close said rectangular opening and to be normally swung to the raised and open position by said counterweights, and a latch normally locking said door frame to said main frame, with means for releasing said latch when desired.

3. A chute for coal or the like comprising a rectangular main frame adapted to be attached to the side of a building and provided with a central opening, a rectangular hood attached to the back of said frame and provided with a downwardly inclined bottom, arms provided with counterweights pivoted to said hood, a door frame carried by said arms and adapted to close said rectangular opening and to be normally swung open by said counterweights, a latch automatically locking said door frame to said main frame, and means operable from a distance for releasing said latch when desired.

4. A chute for coal or the like comprising a rectangular main frame adapted to be attached to the side of a building and provided with a central opening, a rectangular hood attached to the back of said frame and provided with a downwardly inclined bottom, arms provided with counterweights pivoted to said hood, a door frame carried by said arms and adapted to close said rectangular opening and to be normally swung open by said counterweights, a latch normally locking said door frame to said main frame, with means for releasing said latch when desired, an auxiliary chute pivoted to said main frame, and means automatically operated by said counterweights for moving said chute into said opening when the door frame is raised.

5. A chute for coal or the like comprising a rectangular main frame adapted to be attached to the side of a building and provided with a central opening, a rectangular hood attached to the back of said frame and provided with a downwardly inclined bottom, arms provided with counterweights, pivoted to said hood, a door frame carried by said arms and adapted to close said rectangular opening and to be normally swung open by said counterweights, a latch normally locking said door frame to said main frame, means for releasing said latch when desired, an auxiliary chute pivoted to said main frame, and links connecting said auxiliary chute to said counterweights.

6. A chute for coal or the like comprising a rectangular main frame adapted to be attached to the side of a building and provided with a central opening, a rectangular hood attached to the back of said frame and provided with a downwardly inclined bottom, arms provided with counterweights pivoted to said hood, a door frame carried by said arms and adapted to close said rectangular opening and to be normally swung open by said counterweights, a latch automatically locking said door frame to said main frame, means operable from a distance for releasing said latch when desired, an auxiliary chute pivoted to said main frame, and links connecting said auxiliary chute to said counterweights.

7. A chute for coal or the like comprising a rectangular main frame adapted to be attached to the side of a building and provided with a central opening, a rectangular hood attached to the back of said frame and provided with a downwardly inclined bottom, oppositely disposed arms provided with counterweights pivoted to said hood, a door frame rigidly connected to said arms and adapted to close said rectangular opening and to be normally swung open by said counterweights, and means for holding said door frame in the closed position.

8. A chute for coal or the like comprising a rectangular main frame adapted to be attached to the side of a building and provided with a central opening, a rectangular hood attached to the back of said frame and provided with a downwardly inclined bottom, oppositely disposed arms provided with counterweights pivoted to said hood, a door frame rigidly connected to said arms and provided with a glass panel therein adapted to close said rectangular opening and to be normally swung to the raised and open position by said counterweights, and means for holding said door frame in the closed position.

9. A chute for coal or the like comprising a main frame adapted to be attached to the side of a building and provided with a central opening, a hood attached to the back of said frame and provided with a downwardly inclined bottom, oppositely disposed arms provided with counterweights pivoted to said hood, a door frame rigidly connected to said arms and adapted to close said opening and to be normally swung open by said counterweights, a latch automatically locking said door frame to said main frame, and means operable from a distance for releasing said latch when desired.

10. A chute for coal or the like comprising a rectangular main frame adapted to be attached to the side of a building and provided with a central opening, a rectangular hood attached to the back of said frame and provided with a downwardly inclined bottom, oppositely disposed arms provided with counterweights pivoted to said hood, a door frame rigidly connected to said arms and adapted to close said rectangular opening and to be normally swung open by said counterweights, an auxiliary chute pivoted to said main frame, and means automatically operated by said counterweights for moving said chute into said opening when the door frame is raised.

11. A chute for coal or the like comprising a main frame adapted to be attached to the side of a building and provided with a central opening, a hood attached to the back of said frame and provided with a downwardly inclined bottom, oppositely disposed arms provided with counterweights pivoted to said hood, a door frame rigidly connected to said arms and adapted to close said opening and to be normally swung open by said counterweights, a latch normally locking said door frame to said main frame, means for releasing said latch when desired, an auxiliary chute pivoted to said main frame, and links connecting said auxiliary chute to said counterweights.

12. A chute for coal or the like comprising a rectangular main frame adapted to be attached to the side of a building and provided with a central opening, a rectangular hood attached to the back of said frame and provided with a downwardly inclined bottom, oppositely disposed arms provided with counterweights pivoted to said hood, a door frame rigidly connected to said arms and adapted to close said rectangular opening and to be normally swung open by said counterweights, a latch automatically locking said door frame to said main frame, means operable from a distance for releasing said latch when desired, an auxiliary chute pivoted to said main frame, and links connecting said auxiliary chute to said counterweights.

13. In a device of the character set forth, in combination, a chute, a closure arranged to move into the chute to open position and to close the mouth of the chute when in closed position, an auxiliary chute movably supported within the former chute so that it may be moved from a position within the chute to a position wherein it projects from the front of the chute, and operative connections between the auxiliary chute and closure whereby the auxiliary chute is automatically projected from the front of the first mentioned chute when the closure is moved to open position, and is likewise retracted into said chute when the closure is moved to closed position.

14. In a device of the character set forth, in combination, a chute, a closure, means pivotally supporting the closure so that it may swing from closed position wherein it closes the mouth of the chute to open position within the chute, an auxiliary chute pivoted within the former chute so that it may rotate from a position therewithin to a position wherein it projects from the front of said chute, and link connections between the auxiliary chute and the door supporting means whereby when the door is moved from closed to open position, the auxiliary chute is automatically projected through the front of the first mentioned chute.

15. In a device of the character set forth, in combination, a chute, a closure, arms pivoted within the chute and whereby the closure is carried, an auxiliary chute pivotally supported within the former chute so as to swing from a position therewithin to a position wherein it projects through the mouth of said former chute, a link connections between the auxiliary chute and the aforesaid arms, means tending to rotate the arms upon their pivots in a direction to swing the closure from closed position wherein it extends across the mouth of the chute to open position within the chute, and latch mechanism for normally retaining the door in closed position.

16. In a device of the character set forth, in combination, a chute, a closure for the chute, an auxiliary chute arranged to project from the former chute when the closure is open, means tending to open the closure and project the auxiliary chute, a latch for restraining said means, and means for releasing the latch.

17. In a device of the character set forth, in combination, a chute, a closure arranged, when in closed position, to close the mouth of the chute, means pivotally supporting the closure on an axis situated a material distance inwardly from the mouth of the chute and whereon the closure is adapted to swing through an orbital path to open position within the chute, means for locking the closure in closed position, and means for automatically moving the closure to open position when the aforesaid locking means is released.

In testimony whereof I hereunto affix my signature.

JOHN E. McMINN.